United States Patent [19]

Wolters

[11] 4,042,780
[45] Aug. 16, 1977

[54] MULTIPLE MESSAGE FRAME ADAPTOR APPARATUS FOR LOOP COMMUNICATION SYSTEM

[75] Inventor: Frederick J. Wolters, Whitefish Bay, Wis.

[73] Assignee: Johnson Controls, Inc., Milwaukee, Wis.

[21] Appl. No.: 598,377

[22] Filed: July 23, 1975

[51] Int. Cl.² .............................................. H04J 3/14
[52] U.S. Cl. ........................ 179/15 AL; 179/15 BF; 307/64; 307/219
[58] Field of Search ......... 179/15 BF, 15 AL, 18 ES; 178/73; 307/64, 219; 333/3; 340/172.5, 146.1 BE

[56] References Cited

U.S. PATENT DOCUMENTS

| 3,458,661 | 7/1969 | Forde | 179/15 AL |
|---|---|---|---|
| 3,544,719 | 12/1970 | Kahlbrock | 178/73 |
| 3,557,315 | 1/1971 | Koby | 179/18 ES |
| 3,652,798 | 3/1972 | McNeilly | 179/15 AL |
| 3,818,237 | 6/1974 | Straus | 307/64 |
| 3,859,468 | 1/1975 | Smith | 179/15 BF |
| 3,909,510 | 9/1975 | Luce | 178/58 R |
| 3,920,975 | 11/1975 | Bass | 340/146.1 BE |

Primary Examiner—David L. Stewart

Attorney, Agent, or Firm—Andrus, Sceales, Starke & Sawall

[57] ABSTRACT

A serial data communication loop system includes single input-output controllers and/or dual message transmission with a novel adaptor unit for converting from a single to dual message frame and/or from a dual to single message frame. The message frames are multiple bit binary coded signals. The adaptor unit includes first and second converting sections, the first converting from a single input to dual output message frames and the second from a pair of identical messages to a single message output. The first section includes an amplifier connected to a polarity and level sensor and to a time delay which activates a disable timer to the amplifier and a strobe timer to operate a pair of transmitters to transmit the dual message frames. The second section includes a pair of receivers connected to a logic selector in combination with individual monitors which encode the status at the receivers to normally transmit from one receiver and automatically change to the second if the first fails. The adaptor may connect the input and output ports of a controller to a pair of parallel transmission trunks, automatically switch between main and back-up loop controllers connected in either a single or multiple trunk system, and provide an individual or group remote unit with message continuity if an individual or group loop is broken.

30 Claims, 8 Drawing Figures

MULTIPLE MESSAGE FRAME ADAPTOR APPARATUS FOR LOOP COMMUNICATION SYSTEM

BACKGROUND OF THE INVENTION

This invention relates to a multiple message frame adaptor apparatus for loop communication systems and particularly to such an adaptor for selective connection of a single message frame originating device into the system.

Digital loop communication systems are advantageously employed in the monitoring and transmission of data and other information between a central controller and remote stations. A very satisfactory loop system is disclosed in U.S. Pat. No. 3,845,472 wherein a computer programmed loop controller is operable to generate multiple bit message frames in timed spaced sequence, with the frames serially passed through a plurality of remote stations. Each of the remote stations includes a message processing unit which includes suitable frame handling logic for continuously detecting the status of each of the message frame bits and, if appropriate, providing communication at such remote stations and retransmitting of the message frame either modified or unmodified to the next downstream station.

In certain applications generally identified as life safety type systems which may provide for fire detection, burglary alarm systems and the like, a single loop system may not provide the level of security required or desired. A short or open fault in the transmission loop will terminate communication. Although such fault conditions can be readily identified, as disclosed in the above-mentioned patent, alarm conditions arising during the failure of the transmission path would go undetected and thereby present a potentially hazardous situation. The copending application of Strojny et al entitled "DATA COMMUNICATIONS SYSTEMS EMPLOYING REDUNDANT SERIES TRANSMISSION LOOPS" Ser. No.598,376 filed on the same day as this application and assigned to the same assignee, discloses a redundant transmission path system with increased reliability and security of transmission. As more fully discloses therein, the several remote stations are interconnected to each other and to message frame sources through primary and secondary transmission paths or trunks. The primary trunk is normally connected to the frame processing means. A monitoring means detects failure thereof to automatically and directly connect the secondary trunk at that station to the frame processing means. Dual transmission means, of course, require a dual message frame source to provide for the appropriate generation of the dual frames for transmission over the pair of trunks and must be able to terminate the two received completely processed messages. Further, the dual loop system disclosed does not protect against a fault in the controller station. Thus, if the controller should malfunction, the total data communication would be inactive.

An extremely high security application of the loop system may further require the use of a backup message frame source with or without the redundancy in a loop control system. Thus, if a central controller or a message source terminates, all loop communication, of course, terminates in either a single or dual transmission system. The safety life system may be desirably provided with a primary loop controller in combination with a secondary or backup loop controller with means for automatic interconnecting of the secondary unit into the system in response to failure of the primary controller. Further, many data loop systems only require the single transmission loop and the conventional redundant system may require significantly different constructions, with attendant initial manufacturing complexities and costs.

SUMMARY OF THE PRESENT INVENTION

The present invention is particularly directed to a multiple message frame transmitting and terminating adaptor unit for connection of single message frame originating means into a data communication loop system to produce system redundancy and thereby increase the security and reliability of the system. Generally, the novel adaptor unit includes means for converting from a single to dual message frame signal condition and/or from a dual message to a single message frame signal condition, directly in response to receipt of a message frame signal.

The present invention particularly employs a direct and reliable logic switching means which can be readily constructed as an adaptor means for interfacing and connecting of standard single loop components into a multiple or redundant system. For example, a single loop controller may be connected directly into a multiple trunk loop system, or a plurality of such controllers may be connected in a single or multiple trunk system for reliable transmission within a data communication serial loop system.

Generally in accordance with the present invention, a loop controller adaptor unit includes a pair of logic signal processing sections including a first converting section for selectively converting a single input message frame signal into a plurality of corresponding output message frame signals and a second converting section adapted to receive a plurality of message frame signals and operable to select and transmit one of such message frame signals from a single transmitter to provide a single output. The system with the combined input-output connections permits the adaptor to be directly employed to adapt and connect loop controllers to various forms of high security loop configurations. The converting sections operate directly in accordance with the received message frame signals and do not require additional external commands or controls to effect the desired functioning and signal transmission. Suitable message status identification and indicating means may be provided as well as by-pass means if the system functions to completely interrupt normal communications.

The dual nature of the system will also permit the unit to be used directly to automatically switch between a main loop controller and a backup loop controller or other signal originating and terminating means. The controllers may be connected in either a single or multiple loop trunk system. In such system, the primary controller normally transmits the desired messages and originates and terminates each of the circulated messages.

More particularly, in accordance with a preferred novel construction of the present invention, the first message frame converting section may include an input amplifying or isolating means for transmitting of the binary logic message signals. This signal is simultaneously applied to a polarity responsive means and a timing means, the output of such means being connected to and jointly controlling a pair of corresponding binary logic signal transmitters. The polarity responsive means senses the logic polarity of the input signal and sets the level and polarity for the output signals of the transmitters. The timing means includes a plurality of timing devices to provide for the reliable transmission of the pair of signals from the transmitters. A first timing device establishes a very short delay time sufficient to allow propagation of the logic signals from the receiver to the transmitter input. The output of the first timing device activates a second and a third timing device, one of which is connected to positively turn-off the incoming signal amplifier or like means for a short time but sufficient to completely eliminate input line noise from being retransmitted through the circuit. The third timing device operates to strobe the transmitters to place or transmit the message frames information onto the two output trunks. The several timing devices are selected in relationship to the period of the binary input signal and the minimum time requirement to essentially eliminate propagational error of the binary signal.

The present inventor has found that the timing delay can be readily restricted to one-quarter of the total input signal time and, in effect, the dual loop transmitting section remains essentially transparent to the loop signals. The adaptor can, therefore, be readily employed in a practical application without introducing unacceptable levels of delay.

The second converting section includes a plurality of message frame incoming receivers connected to a selector in combination with a monitoring means to selectively transmit each of the received signals to an output means. The monitoring means controls the logic selector to normally transmit from a first path and to automatically charge over to a second path in the event of failure of the first path. The output of the logic selector is connected to a logic level sensing means and a timing means similar to that of the first converting section. The outputs of the latter conjointly control a single transmitter for transmitting of the message frame as an exact replica of the incoming message frame.

More particularly, in the preferred construction of a dual path conversion unit, each of the receivers is coupled to actuate the sequenced timing unit. After a predetermined slight delay, the timer output simultaneously strobes the information through the selection logic circuitry.

The selection monitoring means includes a pair of individual signal sensors or monitors, each of which includes digital outputs providing a logic signal related to the presence of an information bit, or the absence thereof from the two receivers.

The receivers are also connected directly to throughput switches for transmission of the message frame signal in response to the gating or strobe signal. The signal sensors have their outputs connected to a pair of logic gates one of which controls the first throughput switch and the other of which controls the second throughput switch. The first logic gate is connected to the corresponding output of the two sensors whereas the second logic gate is connected to the opposite output of the two sensors. This automatically selects the first trunk as a primary signal transmission path which will be put through the system as long as a signal is received from that trunk. In the absence of a signal thereon and in the presence of a signal in the other loop, the system will automatically transmit the signal of the second loop. However, if the second loop is being transmitted, reactivation of the first loop will automatically convert and immediately put through the signal from the first path. In the absence of a signal from either loop, the first path is conditioned for transmission. However, if the second loop should be reactivated first, that path will be automatically and directly transmitted through the system, after which the above sequence will again occur.

The output of the sensors are also coupled through a suitable driving means to a suitable indicating means such as visual alarms or other suitable sensory type units as well as status sensing means for transmission of the status of the loops to provide direct communication and processing of the signals.

The multiple sections of the dual loop adaptor permit the direct adaptation of single and dual loop transmission systems, with and without backup controllers. For example, in a dual loop transmission system such as described in the previously identified copending application of Strojny et al, a single channel message frame originator and termination device such as a loop controller, an operating console or the like may have its input connected to the single output of the dual loop adaptor and its output connected to the single input of the dual loop adaptor. The dual inputs and dual outputs of the dual loop adaptor provide for direct dual connection of the primary and secondary trunk systems of the dual transmission loop system.

Alternately the dual loop adaptor can be employed with the dual input/output interconnected to provide for interconnection of the primary loop controller and backup loop controller into a single loop system through the single input/output means.

Further, by employing a pair of the dual loop adaptors, a primary and secondary or backup controller may be connected in a dual loop transmission system.

The adaptor components are compatible with all of the other components of a single transmission loop system and thereby permit the use of a plurality of basic loop elements with the interfacing means adapting the systems to the various forms of security configuration such as multiple controllers, multiple trunk transmission or combinations thereof.

In the dual loop, dual controller system, one dual input/output connects the outputs of the two controllers to the dual trunks for selective transmission of the message frames from one of the controllers. The second adaptor serves to connect the incoming dual trunks to the first adaptor for connection to both controllers. The adaptors thus provide for transmitting and receiving of the parallel synchronized message frames for processing through a single message processing controller.

The present invention has been found to provide a simple reliable and relatively inexpensive method of adaptation of a data communication single loop system to a multiple controller-multiple loop system with the appropriate identifying and indicating means for operator and system notification while maintaining acceptable levels of data processing and transmission times. The development of a basic adaptor provides a relatively inexpensive and practical production structure.

BRIEF DESCRIPTION OF THE DRAWINGS

The drawings furnished herewith illustrate a preferred construction of the present invention in which the above advantages and features are clearly disclosed as well as others which will be readily understood from the following description of such illustrated embodiments.

In the drawings.

DESCRIPTION OF THE ILLUSTRATED EMBODIMENT

Figure 1:
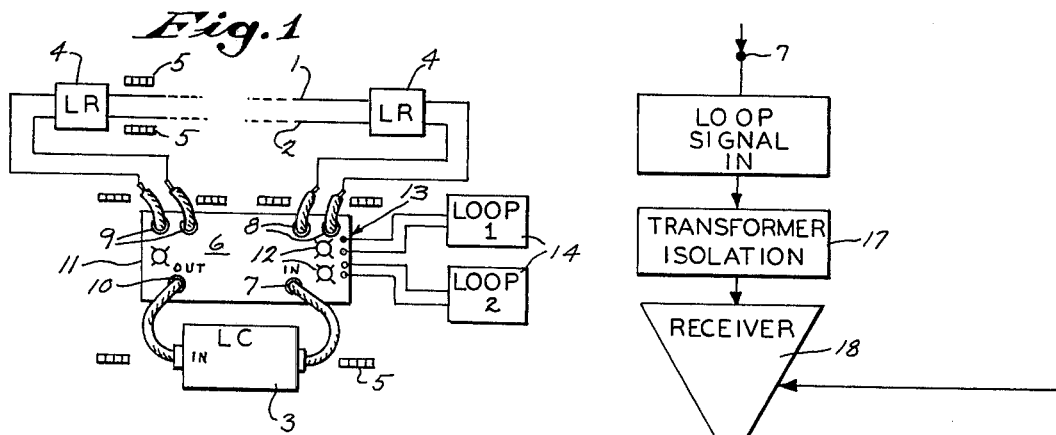
FIG. 1 is a simplified diagrammatic illustration of a data communication loop system employing dual transmission paths and a dual loop adaptor constructed in accordance with the present invention for connecting a single loop controller as the dual originating and terminating element.

Referring to the drawings and particularly to FIG. 1, the present invention is illustrated applied to a dual loop data communication loop system employing a pair of transmission trunks 1 and 2 connected in a series loop system between a single loop controller 3 and a plurality of remote stations 4. The dual trunk system is preferably constructed as disclosed in the copending application of Strojny et al which was filed on even date herewith and is assigned to the same assignee as this application.

The loop controller 3 includes a stored program computer which is capable of performing sequences of internally stored instructions and furthermore is capable of modifying such instructions as directed by the internal instructions and circuit programming. The controller 3 will further include means for generating time spaced information or message frames 5, each of which is divided into a series of binary signal bits which may be conveniently identified by the conventional logic symbols as logic 0 or 1. The digital bits of each message frame establish a means of communication with the remote stations for transmitting and receiving of information from the controller 3 to stations 4 in accordance with the teaching of U.S. Pat. No. 3,845,472. As also disclosed therein, an operational console unit may also provide for message frame generation and termination and the present invention may also be employed with such devices. The terminology controller or controller means may, therefore, broadly cover the various message originating and terminating means for purposes of discussing this invention and the several embodiments thereof.

As more fully disclosed in the Strojny et al application, a dual loop system requires that duplicate message frames are simultaneously and synchronously transmitted throughout the loop over both trunks 1 and 2. Each remote station 4 includes a message frame logic handling means, not shown herein, for selecting one of the trunks as the input processing of the message frame and retransmitting of such processed message frame over both of the outgoing trunk segments from the remote unit to thereby reinstate the dual message frame transmission. The loop controller 3 can, of course, be specially constructed to generate the plurality of synchronized message frames directly or separate synchronized message frame sources can be provided. The present invention is particularly directed to a dual loop adaptor unit 6 which permits interfacing of a loop controller 3 with single input-output (I/O) ports to the multiple loop system. In the embodiment of FIG. 1, a dual loop adaptor 6 construced in accordance with the present invention interconnects a single posted loop controller unit 3 to originate a pair of message frames 5 which are to be transmitted in synchronism over the parallel or dual trunks 1 and 2. The loop controller 6 generates the series of time spaced message frames 5 to the dual loop adaptor 6 which includes a single input terminal 7 and output terminals 8 connected to transmit, in synchronism, a pair of identical message frames 5 over the outgoing trunks 1 and 2. Similarly, the parallel message frames 5 are applied to the dual loop adaptor 6 at the dual input terminals 9 and a single message frame output 10 is connected to the input side of the loop controller 3 as shown in FIG. 1. The dual loop adaptor unit 6 preferably also includes suitable indicating means 11 to provide for indication of the power condition as well as individual loop status indicators 12 which indicate the status of the two trunk systems with respect to the transmission and receipt of the message frame 5. In addition, status terminals 13 may be provided establishing a binary logic output which may be connected to a contact status and sensing unit 14 such as disclosed in U.S. Pat. No. 3,832,680, the output of which is interconnected to the stored program unit for appropriate communication within the system.

Figure 2:
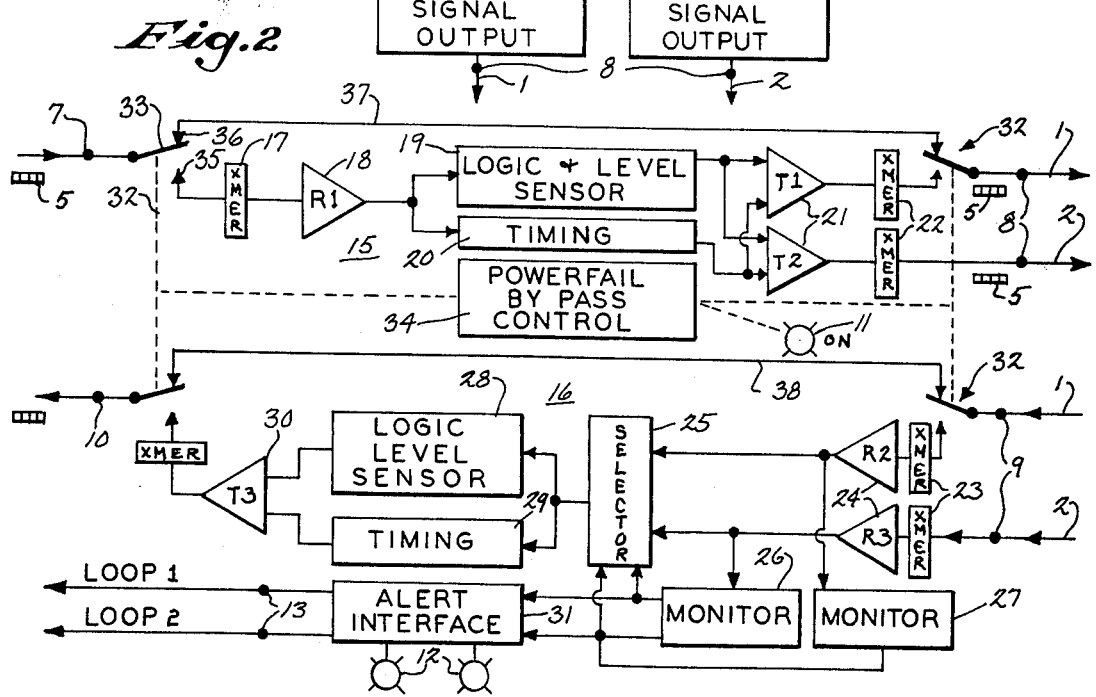
FIG. 2 is an expanded block diagram of the dual loop adaptor construction shown in a single block in FIG. 1.

A block diagram of a preferred construction of the dual loop adaptor unit 6 is shown in FIG. 2. Generally, in accordance with the previous discussion, the unit 6 includes a single input to dual output converting section 15 for transmitting of the single message frame 5 of the loop controller 3 as the pair of message frames loop and a second converting section 16 for converting the two received or terminated message frames 5 to the single message frame for transmission to the single frame processing loop controller 3.

The single to dual frame converting section 15 includes an isolating transformer 17, which is similarly provided for all other input and outputs of the dual loop adaptor unit 6 to isolate and prevent system ground loop currents from propagating throughout the system. Such currents would disrupt the reliability of the communication system. The output of the transformer 17 is connected to a suitable receiver amplifier 18 which operates to amplify the logic signals to a suitable level for coupling to the input of a logic and level sensor 19 and a timing means or device 20. The logic and level sensor 19 appropriately senses the level of the input signal and the polarity. The output of the logic level sensor 19 is coupled to a pair of transmitting amplifiers 21, the outputs of which are coupled through isolating transformers 22 to the output terminals 8 and thus connected to the dual trunks of the communication loop system for transmission of the message frames 5 to the first remote station 4.

The timing device 20 controls the transmission of the set logic signals through the transmitters 21 to ensure reliable signal formation and transmission. Generally, as more fully developed hereinafter the timing device will provide for an initial delay to allow all transient signals to dissipate while permitting adequate propagation of the logic signals after which the receiver 18 is disabled and the transmitters 21 are strobed for appropriate periods to provide for propagation of the digital signals. Transmission may be within one-quarter of the total input signal time which essentially and practically makes the dual loop adaptor unit 6 transparent to the signals.

In this manner, the adaptor unit 6 provides for reliable processing and transmission of each incoming meassage frame 5 as a pair of simultaneously generated and identical message frames.

Similarly, the dual message frames 5 circulate throughout the loop system preferably in accordance with the teaching of the Strojny et al application as previously described and are finally returned to the loop controller 3 for final processing via the adaptor unit 6.

The receiving or terminating section 16 of the illustrated dual loop adaptor unit 6 includes the pair of input ports 9, each of which includes an isolating transformer 23 connected to the respective incoming trunk lines 1 and 2 and to the input of signal amplifiers 24 for increasing the level of the signals for processing and transmission to the loop controller 3. The output of the receivers 24 are connected through a selection circuit including a channel selector 25 having a pair of inputs. The channel selector 25 has a single output for transmitting of the message frame from either one of the inputs in accordance with a logic selection.

The output of each of the receivers 24 is further monitored to detect the presence and absence of the signals. In the illustrated embodiment similar individual monitors 26 and 27 have an input connected to the output of the respective receivers 24. The output of the monitors 26 and 27 provide a binary address or logic signal to the selector 25 and activate the selector 25 to transmit the message frame if present from either one or both of the receivers 24. The output of the selector 25 is connected to a logic level sensor 28 and to a timing device 29 similar to that of section 15, with the output connected to a single transmitter 30. The output signal of the transmitter 30 is an identical copy of the particular message frame which has been selected from the two incoming trunks 1 and 2 connected via the output port or terminal 10 to the input or receiving port of the loop controller 3, as shown in FIG. 1.

Monitors 26 and 27 maintain a continuous indication of the status of the incoming trunks. The outputs of the monitors 26 and 27 are also connected to an interfacing circuit 31 for selectively energizing of the loop status lamps 12 and producing a binary signal on the status output terminals 13. The interface device 31 preferably includes normally opened and closed contacts to provide a binary logic signal particularly adapted for connection into status sensing networks as previously described. In practice, the output is closed when a message is being received and open when a message is not being received.

The dual loop adaptor unit 6 preferably includes bypass switch means permitting direct transmission over the primary trunk line 1 or for conection in a single loop system over the primary trunk line 1 or for connection in a single loop system. In FIG. 2, the ports 7-10 are shown connected to single-pole, double-throw switches 32 having the several movable as well as suitable poles 33 coupled to a control unit 34 for purposes of simplicity and clarity of illustration. Suitable multiple pole and multiple contact relays may be employed in commercial systems. With proper power supplied, the switches connect the ports to the converting sections 15 and 16. In the event of a power failure or malfunction, the switches 32 are actuated to connect the several ports to the section by-pass lines. Referring to port 7, the pole 33 is connected to the port 7 and selectively engages a processing contact 35 connected to transformer 17 of section 15 and a contact 36 connected to a section by-pass line 37. Switch 32 at port 8 of trunk 1 similarly connects the outgoing trunk 1 to transformer 22 or to by-pass line 37. Section 16 includes a similar by-pass line 38 with switches 32 similarly connecting the input-output ports for direct or selective transmission through the adaptor unit 6.

Figure 3:
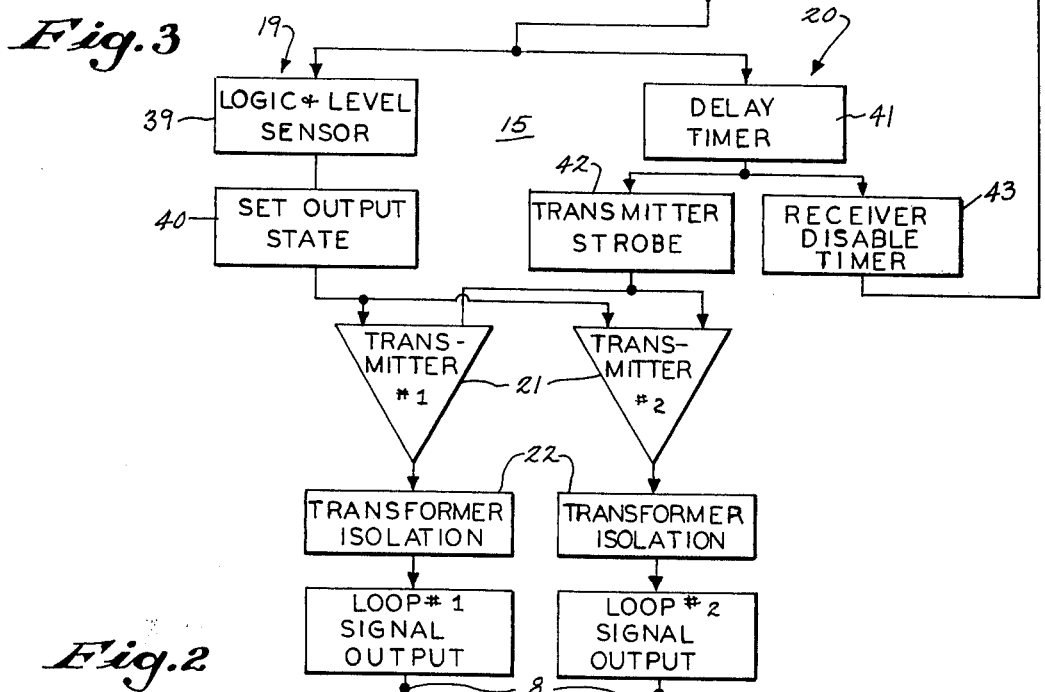
FIG. 3 is a schematic diagram of the expanded block diagram shown in FIG. 2 and in particular showing the method of converting a single message frame to dual message frames.
Figure 4:
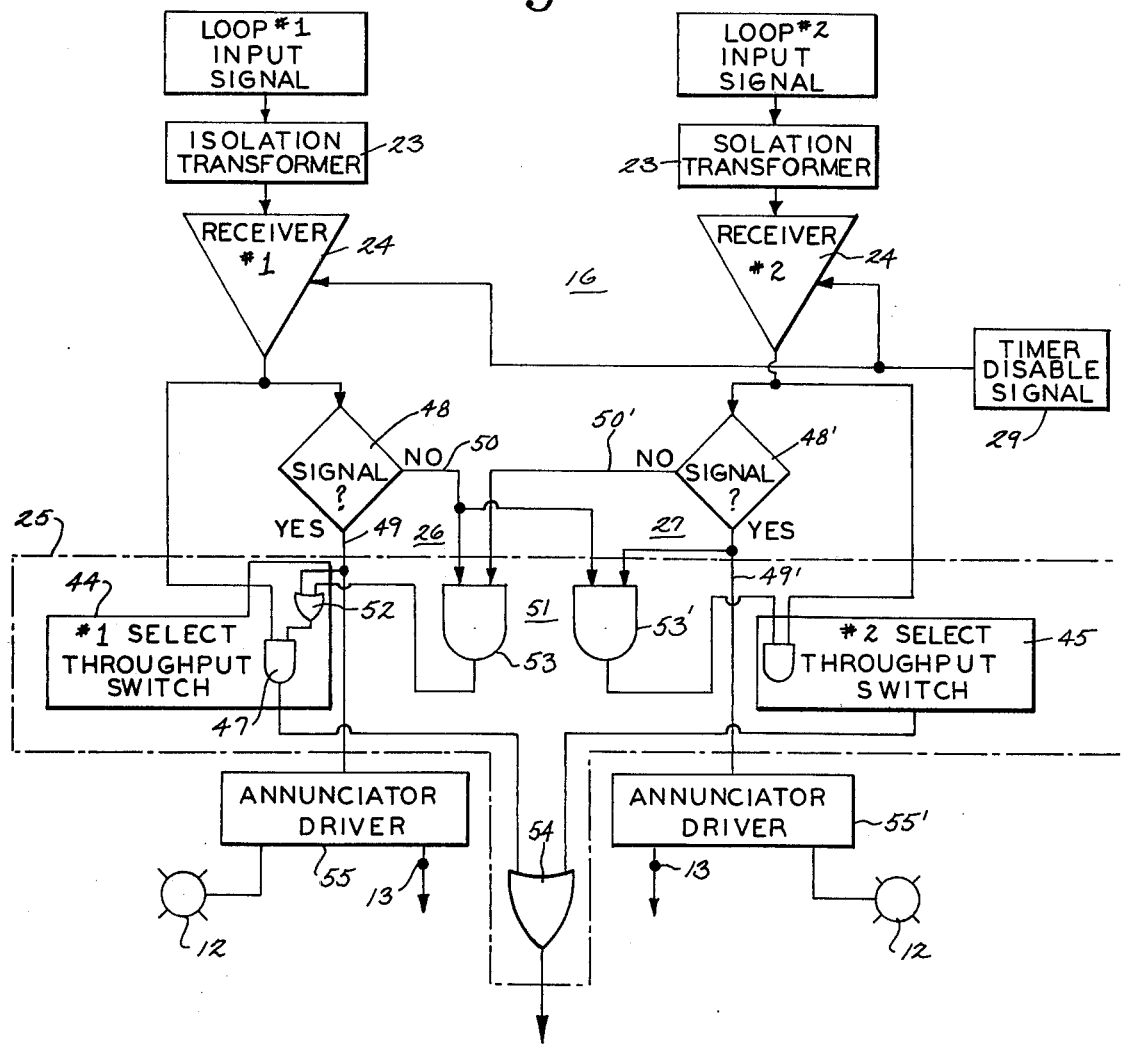
FIG. 4 is a view similar to FIG. 3 illustrating the conversion from a pair of message frame channels to a single message frame channel.

A more detailed illustration of preferred converting sections 15 and 16 of FIG. 2 are disclosed in FIGS. 3 and 4. The corresponding elements in the figures are identified by corresponding numbers for simplicity and clarity of explanation.

Referring to FIG. 3, the single to dual port converting section 15 of sensor unit 19 includes a level sensor 39, the output of which is connected to a signal polarity setting unit 40. The sensor 39 ensures response only to the binary signal which provides for establishing of a fixed output signal appropriate for generating of a duplicate of the input signal. The set output state may be a suitable bistable device adapted to establish a logic 1 or logic 0 related voltage signal. This signal is transmitted to and by the transmitters 21 for transmission over coaxial cables or trunks 1 and 2. The timing device 20 in the embodiment of the invention shown in FIG. 3 includes a delay timer 41 having an input connected to the output of the receiver 18. The delay timer 41 introduces a very short time delay sufficient to allow the propagation of the appropriate logic signals from the receiver 18 through the logic level sensor 39 and output setting unit 40.

The delay timer 41 times out and energizes a transmitter strobe timer 42 and receiver disable timer 43.

The receiver disable timer 43 has its output connected back to disable the receiver 18 and effectively disconnects the incoming signal circuit from the processing circuit. The disabling of the receiver 18 thus eliminates transmission of input line noise through the system and thus isolates the output from such undesirable transient signals.

The strobe timer 42 activates the transmitters 21 to simultaneously transmit the identical message bits appearing at the inputs from unit 40. For example, in a practical application each bit signal of the incoming message frame 5 may have a period of approximately two microseconds. The delay timer 41 will introduce a delay of approximately one hundred nanoseconds.

The disable timer 43 will have a period of one microsecond while the strobe timer 42 may employ a period of approximately five hundred nanoseconds. The total delay introduced into the system includes a one hundred nanoseconds delay of the delay timer 41 plus the propagation time of the receiver 10 and the transmitters 21. The total time delay will be less than one-quarter of the total input signal time. The dual loop adaptor 6 is, therefore, essentially nearly transparent to the message frames 5 with a completely acceptable and relatively insignificant delay.

The converting section 15 thus provides for the reliable, simple and highly practical conversion from a single message frame 5 to dual message frames 5 and thereby for origination of the necessary multiple message transmission for a dual loop communication system.

FIG. 4 illustrates in greater detail the dual message port or input to single message port or output converting section 16 for terminating of the single message frames 5 at the message processing center or controller 3 in a dual loop system. The outputs of the receivers 24 are connected to the logic selector unit 25 which, in the embodiment of FIG. 4, includes a pair of similar logic channels or throughput switches 44 and 45. The switches 44 and 45 have inputs connected to each receiver 24 and a logic control to provide automatic changeover therebetween under control of monitors 26 and 27. As the circuits associated with each switch are generally the same, that associated with switch 44 is specifically described and similar elements associated with switch 46 are identified by corresponding primed numbers. Generally, circuit 16 includes an output section with signal transmitting components 28 and 29 similar to the single to dual port converting circuit of FIG. 3 to control the transmission of the binary logic signal from a single transmitter 30 and no further description thereof is given. The select throughput switches 44 and 45 are similarly constructed. The throughput switches 44 and 45 includes a multiple input AND circuit 47 connected to "AND" the transmitted message signal with the output of the monitors 26 and 27 to provide control not only in response to the bit transmission circuit but conjointly with the associated monitor.

Referring to monitor 26, a signal sensing circuit 48 is included and is preferably a retriggerable one-shot or suitable monostable multivibrator timing circuit which is triggered by each bit signal in the message frame 5. The timing device or one-shot 48 is connected with a positive or YES output line 49 and a NOT output line 50 providing a pair of opposite level logic signals. The output lines 49 and 50 are interconnected in a logic comparison network 51 of the selector unit 25 to provide for selection of one of the throughput switches 44 and 45 to transmit the message frame from one of the trunks. The monitor 26 thus creates related output signals which are held in a first state by the continuous retriggering of the circuit 48 within the timing period. If the circuit 48 is not retriggered, the circuit is allowed to time-out indicating message bit signal has not been received for a selected time period. The timing circuit 48 is selected with a time period significantly greater than the time period of any given message frame 5; for example, the circuit 26 may have a time period of 250 milliseconds. Thus, the select throughput switch 44 has a dual input AND gate 47 with one input line connected to the message signal of the receiver 24 and a second input connected to the output of the monitor 26 by a two input OR gate 52. The output of the AND gate 47 is, therefore, connected and conditioned for transmitting of the message signal bit in response to simultaneous presence of signals at the receiver 24 and at either the output line 49 of the sensing circuit 48 or the output line of the logic network 51.

The positive output logic signal is assumed to be at a logic 1 when a signal is received to retrigger the one-shot 48. This output is connected directly to the one input of the OR gate 52 of the selector. Thus whenever a message signal frame is transmitted through channel 1, each message bit retriggers the retriggerable one-shot 48 and maintains the positive output at a logic 1. Consequently, the channel will be conditioned to continuously transmit the binary logic signals as received.

The second or NOT output of the circuit 48 is connected to a pair of AND gates 53 and 53' of network 51 for establishing interlocking signals between monitors 26 and 27.

The second monitor 27 also includes the retriggerable one-shot unit 48' establishing a positive logic output line 49' and a NOT output logic line 50'. Line 50' is connected as the second input of the AND gate 53 along with output line 50. Thus, when neither of the channels is transmitting a message frame, such as will occur during the quiet period between frames or a dual fault, both of the NOT output lines 50 and 50' are at logic 1. The AND gate 53 establishes a positive signal to the second input of the OR gate 52 thereby also conditioning the switch 44 of the first channel for transmission of the binary bit message signals. Thus, when a message frame 5 is again received the signal will be transmitted through the selector switch 44.

The second interlock AND gate 53' has its one input connected to the NOT output line 50 of the first channel sensing circuit 48 and as its second input connected to the positive logic output line 49' of the circuit 48' of the second channel. The output of the second AND gate 53' of logic network 51 is connected directly to the AND gate 47' of the second channel selector switch 45 which has a second input connected to the receiver 24 of the second channel.

The second channel gate 47' is only activated when the first or primary channel is not transmitting a message frame 5 and while the second channel is transmitting a message frame. For example, if a fault occurs in the first trunk 1 immediately upstream of the loop controller 3 in the illustrated embodiment of the invention, only the secondary trunk 2 is transmitting the signal to the loop controller 3. Under this condition, the second AND gate 47' receives the necessary logic signal and bit signal to transmit.

Thus each of the timer circuits 48 and 48' respond and are commanded only by the message frame bits on the coaxial trunks 1 and 2. There is no outside command signals employed and the unit will continue to operate in accordance with the presence and absence of loop information.

As previously noted, each of the timers is set for a relatively long nominal period greatly in excess of the period of the binary bit signals and longer than the complete time generated for a complete message frame. Consequently, the circuit 48 responds to the significant absence of complete message frames and will not respond to an occasional loss of a bit in the message frame. Other processing within the message frame processing circuitry will compensate and determine the presence and loss of such logic information.

The output of the throughput switches 44 and 55 are connected as a pair of inputs to an OR gate 54 which, of course, functions to directly transmit the message signal from the enabled switch to the transmitter processing units 28 and 29 in accordance with the signal received from the first or second channels associated with the primary and secondary loops.

In summary, the selector gating as illustrated functions to transmit one but only one of the two binary bit informations of the associated message frames to the transmitter 30 and thereby converts the dual trunk transmission system into a single ported output for transmission to the single loop controller 3.

The logic system is established as a result of the coded interconnecting of the monitoring circuits such that if a message frame is sensed on only one of two trunks 1 and 2, that signal is transmitted. If message frames 5 are being transmitted over both trunks 1 and 2, the signal of primary trunk 1 has priority and is transmitted through the selector. If the signal is being transmitted through the selector unit 25 because the trunk 1 had faulted, and, during such time, the primary trunk 1 becomes reactivated, the logic unit 25 immediately transfers the transmission system to transmit the primary trunk signals. Finally, however, if both loops or trunks fail to transmit a signal for a period in excess of the delay of the retrigerable timer circuits 48 and 48', the primary system is conditioned to transmit the subsequent received signals to the transmitter. However, which ever one of the double faulted trunks 1 or 2 is reactivated first, the message frame signals are immediately transmitted through the corresponding channel, after which the system again provides a logic in accordance with the previously described sequencing.

The output is, of course, further processed and retransmitted in the normal manner as in a single channel system.

In addition, the output of the two monitors 26 and 27 and particularly circuits 48 and 48' are connected to suitable, individual indicating driver means 55 for activating of the lamps 12 and the status terminals 13 to indicate the status of the system. The driver means 55 may be suitable Form A relay units and advantageously an electronic opto-isolator relay which functions generally as a Form A relay to reliably define status sensing contacts which may be connected and incorporated into the loop system similar to that disclosed in the U.S. Pat. No. 3,386,688, to which reference may be made for a fuller description of the purpose and circuit connections.

Thus, in operation, the dual loop adaptor 6 is interconnected or coupled to loop controller 3. The output of the loop controller 3 is connected to the single input of the converting circuit or section 15 of the adaptor 6 while the input of the loop controller 3 is connected to the single output of the converting section of the dual loop adaptor 6. The dual output channels of FIG. 3 of the dual loop adaptor 6 are, of course, connected to the first trunk segments 1 and 2 of the dual transmitting trucks and thus initiate the simultaneous and corresponding transmission of identical message frames 5 to the first remote station 4. The dual input channels of FIG. 4 of the dual loop adaptor 6 are, of course, connected to the final trunk segments 1 and 2 of the dual trunk system and the incoming message frames 5 after transmission through all of the remote stations 4 are received for suitable processing and communication, after conversion to a single channel message frame for direction to the dual controller 3.

The circuit thus provides a system which readily adapts the single loop controller 3 to a dual loop redundant system and particularly adapts the device to maintain the desired redundancy while permitting the use of common components for various systems.

Figures 5, 6:
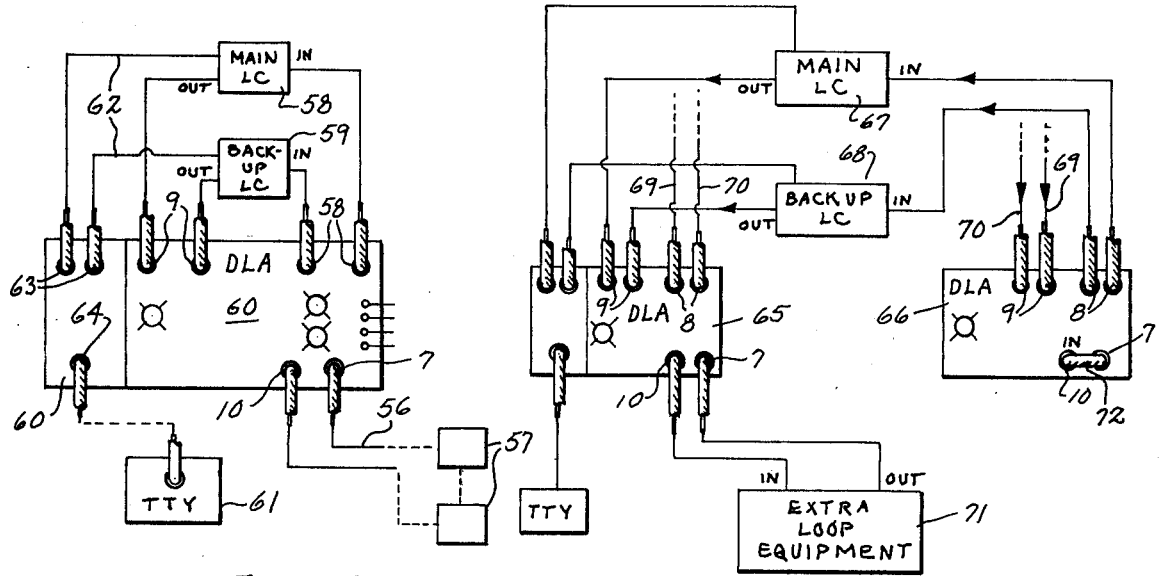
FIG. 5 is a view similar to FIG. 1 illustrating the adaptor unit of FIG. 2 in a system connecting primary and secondary single loop controllers into a single loop system.
FIG. 6 is a further diagrammatic illustration illustrating the interconnection of a pair of the dual loop adaptors, as shown in FIG. 2, connecting primary and secondary loop controllers into a dual loop transmission system.

In addition the dual loop adaptor 6 may be employed to convert a single loop system to a dual or redundant controller system such as shown in FIG. 5, or by employing a pair of the loop adaptors, a dual loop system may include redundant controllers, as shown in FIG. 6.

In particular, referring to FIG. 5, the dual loop adaptor 6 is shown interconnected into a data communication loop system employing a single transmission trunk 56 interconnecting a plurality of remote stations 57 to a central controller station which includes a main or primary loop controller 58 and a back-up or secondary loop controller 59. In this system, the primary loop controller 58 will normally be coupled into the circuit for originating and terminating of the message frames 5 within the single trunk loop system. If the primary loop controller 58 should malfunction or cease to operate for any reason, the secondary loop controller 59 will automatically take over to originate and terminate the message frames 5 including those message frames already in the system.

Thus, referring particularly to FIGS. 2 and 5, dual to single frame converting section 16 of the dual loop controller 6 is connected to controllers 58 and 59 to form the originating frame output at the terminal 10 for input of the message frame 5 to the loop system. The primary channel of the convering section 16 as shown in FIG. 4 is connected to the primary loop controller 58 while the secondary channel is conncected to controller 59. Similarly the single to dual channel converting section 15 has its input 7 connected to the single transmission trunk 56 and its outputs 8 connected to the inputs of the primary and secondary controllers 58 and 59.

Any malfunction or failure to operate which would be sufficient to interfere with appropriate communication within the loop system automatically activates the logic system to automatically convert and introduce the secondary loop controller 59 into the system. The use of the dual loop controllers 58 and 59 with the logic control circuitry to provide an automatic switch-over and conversion will maintain the desired high security redundancy desires where the dual loop controller system is being employed.

A suitable monitoring and indicating monitoring means is connected to the primary and secondary loop controllers 58 and 59 and continuously monitors the operation thereof.

In the embodiment of FIG. 5, the dual loop adaptor is shown with a further dual input to single output section 60 which may be similar to the converting section 16. Section 60 is provided to permit interfacing of the dual or redundant controller 58 and 59 to single teletypewriter 61 or other peripheral equipment. Thus, the controllers 58 and 59 include appropriate teletype connection buses 62 which are connected to the dual input ports 63 of the section 60, which selects the operating controller, with a preference for the main controller 58, and establishes a related output at a single output port 64. The teletype unit 61 is connected to the output port 64.

Where a dual loop transmission and dual controller arrangement is to be provided, a pair of dual loop adaptors 65 and 66 are employed, as illustrated in FIG. 6. The primary and secondary controllers 67 and 68 have the outputs interconnected to the input terminals 9 of dual loop adaptor 65, as in FIG. 5. The output to the dual transmission channels 69 and 70 is through the output terminals 8. The transmission of the message frames 5 may include further processing by passing through appropriate loop equipment 71 connected across terminals 7 and 10. These terminals may be directly connected to transmit the dual frames through section 15 for output over terminal 8, as shown at 72.

Thus the output of the first dual loop adaptor 65 generates a series of parallel message frames 5 originated at either the primary loop controller 67 or the secondary loop controller 68. The pair of simultaneous and identical message frames 5 are passed through the dual transmission trunks 69 and 70 for processing at the loop remote station. The terminating loop trunk segments are connected to the two input terminals 9 of the secondary loop adaptor 66, particulary forming the inputs to the dual to single message frame converting sections such as shown in FIG. 4. The input-output terminals 7 and 10 are interconnected to transmit the converted single message frame through section 15 to form identical message frames at ports 8. The message frame is thus received over one or both of the terminating trunks 69 or 70 and is processed by the converting sections 15 and 16 to generate the dual message frames at the terminals 8 of adaptor 66. The output terminals 8 are connected to the inputs of the primary and secondary dual loop controllers 67 and 68, with actual processing and control by the primary or the secondary loop controllers.

In FIGS. 5 and 6, the terminals 7 and 10 are shown coupled by an external connection means 72. In practice, an internal switching means may be provided with a suitable external operator.

Figure 7:
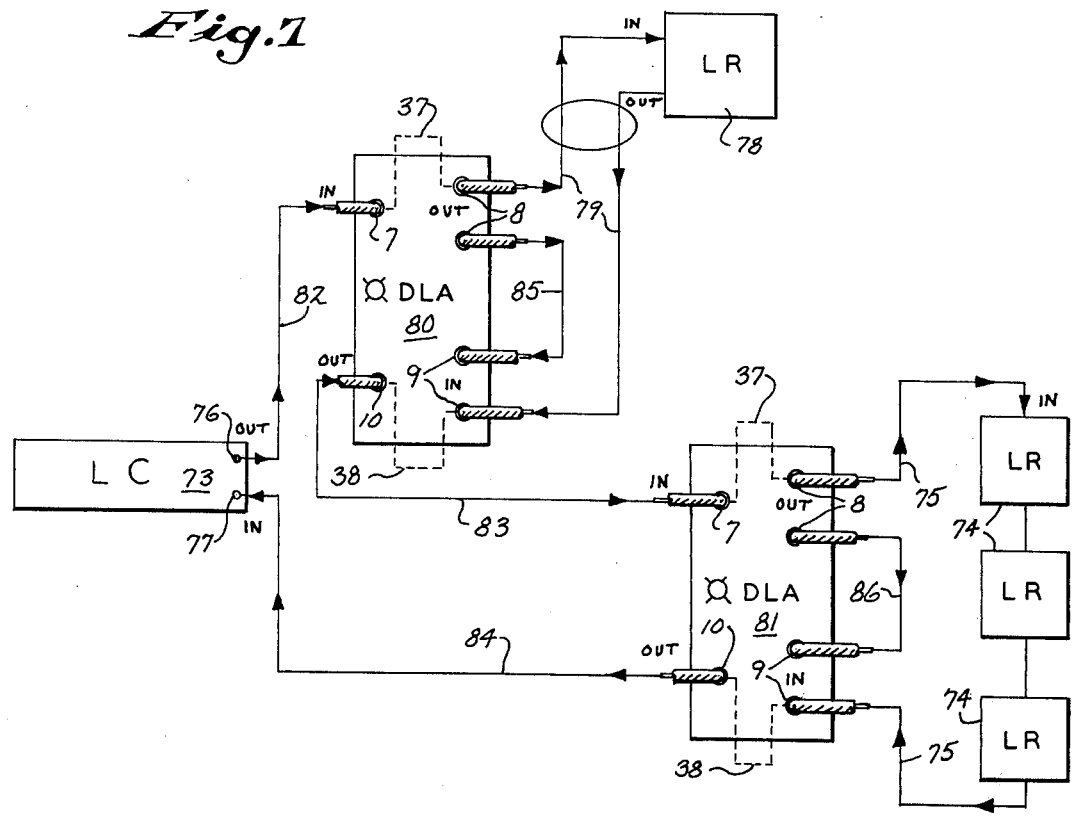
FIG. 7 is a further diagrammatic illustration with dual loop adaptors providing for connection of a new loop segment in series with an existing loop segment and constructed such that communication is maintained within one segment if the other segment includes a failure.

In FIG. 7, dual loop adaptor units of the present invention are shown employed to connect a single ported loop controller 73 into an expansion of an existing system consisting of a plurality of previous loop remote stations 74 including an existing loop trunk or trunks 75. The single ported loop controller 73 would normally have had the output port 76 connected to the input side of trunk 75 and the input or receiving message port 77 connected to the terminal end of the trunk 75. In order to add a new loop remote 78, which may, of course, include one or more series connected units, an appropriate new transmission trunk segment 79 is provided having an input side and an output side connected respectively to the loop remote 78. In the illustrated embodiment of the invention, a first dual loop adaptor unit 80 interconnects the trunk 79 in series between the loop controller 73 and a second dual loop adaptor 81, which connects the output of the new loop remote trunk 79 in series with the old loop remote trunk 75 and the termination port 77 of the loop controller 73. As presently developed, the dual loop adaptors 80 and 81 provide for the normal serial transmission of each message frame through the new loop remote unit 78 and the old loop remote units 74 and, in addition, a break in either transmission trunk 75 or in transmission trunk 79 will disconnect such loop while maintaining communication with the remaining loop.

The dual loop adaptor units 80 and 81 are again similarly constructed in accordance with the previous teaching and may, in fact, include the system such as shown in FIGS. 2 - 4. For purposes of simplicity and clarity of explanation the dual loop adaptors 80 and 81 are assumed to be so constructed and corresponding elements and input-output ports of the dual loop adaptors 80 and 81 are numbered in accordance with the previous numbering for simplicity and clarity of explanation.

In particular, the dual loop adaptor 80 has its single message input port 7 connected by a connecting trunk line 82 to the output port 76 of the loop controller 73. The primary port of the two output ports 8 is connected to the input trunk or side of the trunk 79. The output side of trunk 79 in turn is connected to the primary input port of the dual input ports 9 of the dual loop adaptor 80. In addition, the single message output port 10 is connected by a coupling line 83 to the single input port 7 of the second dual loop adaptor 81. This, thus, provides for normal message transmission through the dual loop adaptor 80 and the primary trunk ports 8 and 9 in series with the added trunk 79 for the loop remote 78.

The second dual loop adaptor 81 is similarly connected to provide for series connection of the trunk 75 through the primary ports. Thus the single message input port 7, as noted previously, is connected to the single message output port 10 of the adaptor 80. The primary output port of the dual message output port 8 of adaptor 81 is connected to the input side of the trunk 75. The output side of trunk 75 is connected to the primary port of the dual input message frame ports 9 of adaptor 81 and finally, the single output message port 10 of adaptor 81 is connected by the termination line 84 to the single input port 77 of the dual loop controller 73.

The message frame normally is serially ciculated from the loop controller 73 through line 82, the dual loop adaptor 80 to the input side of the trunk 79, through the loop remote 78 returning via the dual loop adaptor 80 and line 83 to adaptor 81. The path continues from adaptor 81 through trunk 75 including the serial loop remotes 74 and is returned via the adaptor 81 and line 84 to the single input port 77 of the loop controller 73.

Each of the dual loop adaptors 80 and 81 in the illustrated embodiment of the invention is similarly connected to provide an automatic by-pass and continuity control by interconnection of the secondary input-output dual message ports 8 and 9 of the adaptor units 80 and 81. In particular, the secondary ports of the dual message ports 8 and 9 of adaptor 80 are directly interconnected by the connecting line 85. Similarly, a connecting line 86 interconnects the secondary ports of the dual message ports 8 and 9 of the dual loop adaptor 81. Thus, a break in trunk 79 will terminate communication with the new loop remote 78 or such other loop remote series connected therewith. However, the dual loop adaptor 80 will instantaneously sense the failure and transmission over line 85 will be continued by the dual loop adaptor 80 to port 10 to maintain message transmission to the second loop adaptor 81 and thus to the old loop.

Conversely. a break in the loop trunk 75 will interrupt communication with the loop remote units 74. However, the dual loop adaptor 81 will maintain the serial communication with the new loop remote unit 78 through the interconnecting line 86 to maintain continuity between the connecting lines 83 and 84. Thus a break in either of the trunks 75 or 79 will interrupt communication with the loops connected directly thereto but will maintain and allow loop controller communication with the remaining loop segments.

With the dual loop adaptor units 80 and 81 constructed in accordance with the previous descriptions and embodiments, a power failure in either one of the dual loop units 80 or 81 also activates an automatic by-pass to maintain the communication about the loop contoller or with the loop adaptor. Thus, as shown in dotted line illustration, the dual loop adaptors 80 and 81 similarly include the previously described by-pass lines 37 and 38 such as shown more fully in FIG. 2 to provide for automatic by-pass of the dual loop adaptor in the event of power failure. This provides for direct series connection of the several controllers and will, of course, eliminate the separate and independent communication with the individual old segment 75 and new segment 79 but maintain the desired communication.

Obviously, if the continuity control independent of a particular segment is not desired, the dual loop adaptor for such segment can be eliminated and a direct connection made similar to that effected by the automatic power failure by-pass. For example, in FIG. 7, if the dual loop adaptor 80 is removed and lines 82 and 83 are connected directly to and from a part of the trunk segment 79 the series communication circuit will be established from the loop controller 73 and the dual loop adaptor 81 for the old loop remote units 74. A break in the trunk 75 will maintain communication with the new loop remote 78 in that arrangement. A break in the new segment 79, however, will terminate all communication as a result of the opening of the series connection to the controller side of the dual loop adaptor 81. Similarly, if only the dual loop adaptor 80 were employed and the dual loop adaptor 81 were removed a break in the new segment 79 would remove the unit 78 but permit continued communication with loop remote units 74. With the dual loop adaptor 81 removed, however, a break in the segment 75 would terminate all communication. Thus, the various segments can be separately and interrelatedly interconnected into the system to provide for controlled communication.

Figure 8:
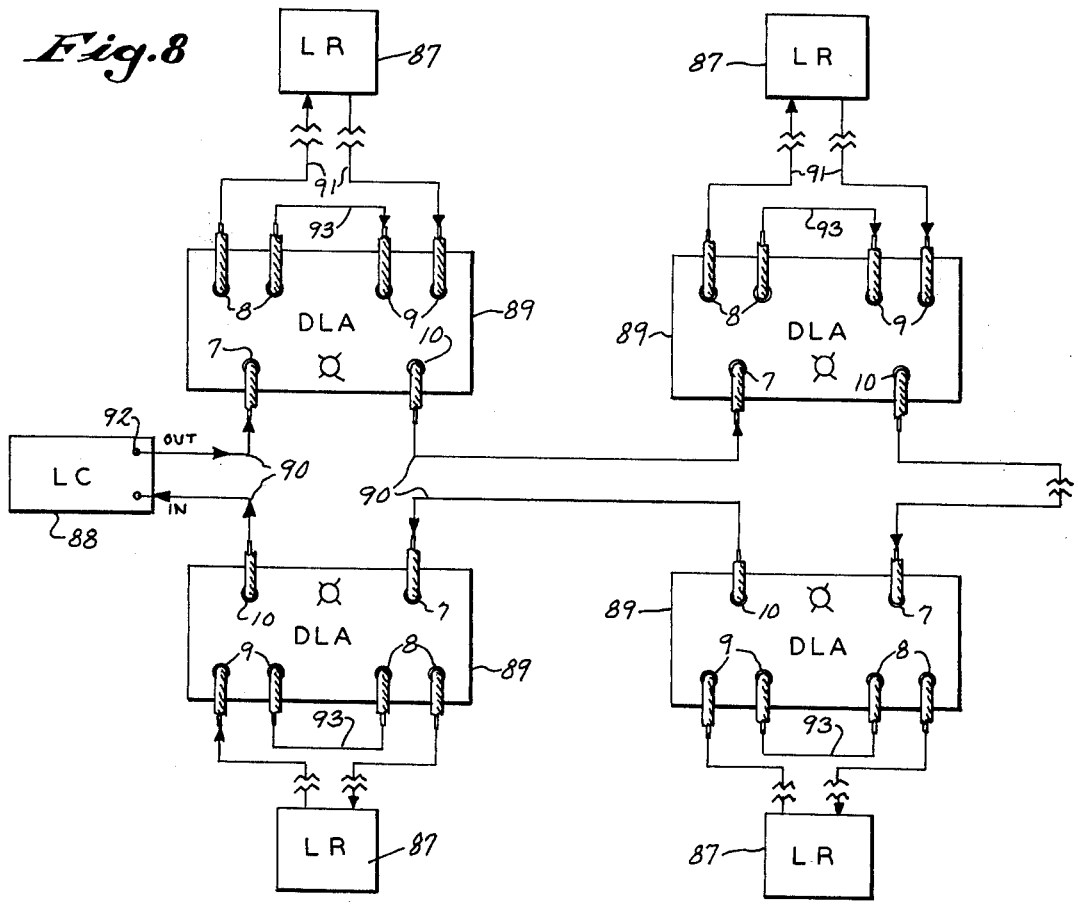
FIG. 8 is a view similar to FIG. 7 further illustrating a plurality of dual loop adaptors connected in a fan-out connection of a corresponding plurality of individual loop remote units.

Under certain applications, it may be highly desirable or required that each of the remote stations be interconnected with means to directly by-pass in the event of an opening in the input circuit to that loop remote. For example, as shown in FIG. 8, a plurality of loop remote stations or units 87 are shown separately and uniquely connected in a fan-out configuration to a loop controller 88 by individual adaptors 89 connected to a main trunk 90. The inputs to each of the loop remote units 87 establishes an isolated serial connection such that loop communication is not broken if any one or more of the inputs to the various loop remotes is broken.

More particularly, communication trunk 90 provides for serial connection of the loop remotes 87 to the single ported loop controller 88. In accordance with the embodiment of the invention shown in FIG. 8, dual loop adaptors 89 provide similar connection of individual remote connecting trunks 91 into the trunk 90. Each of the remote loops 87 is similarly connected and a single unit is described for purposes of description and discussion. Each of the dual loop adaptors 89 similarly is constructed in accordance with the previous embodiments for purposes of description and corresponding terminal elements are correspondingly described or shown and described.

Thus, referring to the loop remote 87 connected immediately to the originating message port 92 from the loop controller 88, the dual loop adaptor 87 has its input port 7 connected to the trunk 90. The dual message output ports 8 have the primary port connected to the loop remote trunk 91 for transmission of the message to the loop remote 87 with the message returned via the opposite side of trunk 91 to the primary of the dual input ports 9 of the dual loop adaptor 89. The output port 10 of the dual loop adaptor 90 is connected to the continuation of trunk 90. Thus the message frame is normally transmitted over the primary trunk connections.

In addition, the secondary ports of the dual ports 8 and 9 are interconnected by a by-pass line 93. If a break in the trunk system 91 occurs the dual loop adaptor 89 will immediately sense such fault and the message frame will be transmitted by the secondary of the dual output ports 8 over line 93 to the secondary of the dual input ports 9 and retransmitted from the output port 10 to maintain continuity of message transmission to the downstream loop remote units 87. In addition, the dual loop adaptors 89 will have the automatic power by-pass units to maintain continuity in the event of power failure in any one of the adaptors and the like.

In the embodiment shown in FIG. 8, the actual construction will generally employ the mounting or clustering of the dual loop adaptors 89 immediately adjacent to the loop controller unit 88 as on a suitable rack 94 (shown diagrammatically in phantom block) with the individual interconnecting radial coaxial lines extending from the central equipment rack to the several loop remote units 88. Any other arrangement can, of course, be employed. Thus the adaptor with the single to dual and dual to single message converting sections provides a highly unique means for adapting of single ported loop controllers and single ported loop remote stations to various configurations and requirements thereby providing significant simplification in the design of various, relatively complex, communication systems.

In the embodiments of FIGS. 7 and 8, the loop remote units should be constructed without the provision of station identification in response to a break in the trunk immediately upstream of the remote unit. If such an internal generating frame system were provided it would, of course, transmit message frames preventing the automatic by-pass through the dual loop adaptor via the by-pass lines 85, 86 and 93. The remote units may, otherwise, be constructed of any suitable design such as disclosed in the previously identified application and patents or of any other suitable design.

The illustrated embodiment of the dual loop adaptor apparatus clearly discloses a reliable and relatively simple means for adapting single loop controller means to single and multiple transmission paths. The apparatus is driven directly from the incoming message bits and establishes an essentially and practically transparent coupling between the controller means and the transmission conducting means.

Various modes of carrying out the invention are contemplated as being within the scope of the following claims, particularly pointing out and distinctly claiming the subject matter which is regarded as the invention.

I claim;

1. In a loop communication system having a controller station having a controller output means adapted to generate time spaced multiple bit message frames and having a controller input means adapted to receive said message frames, a plurality of remote stations, a first transmission trunk line for connecting said controller means and said remote stations in a series conducting loop including a first remote station and a second remote station, a second tramsission trunk line for producing a parallel conducting branch in said loop, a message converting adaptor apparatus for connecting the first and second transmission trunk lines in said loop comprising a first converting means having a single message frame input and a pair of signal transmitting means each one connected to one of a pair of message frame outputs, a signal logic means connected to said input and said outputs and transmitting said message frame from said frame input to both of said transmitting means and thereby producing the same message frame on said outputs as the message frame received at said frame input, means for connecting of the first trunk line to said frame message inputs and to one of said pair of message frame outputs, means for connecting of the second trunk line to the second of said pair of message frame outputs and thereby providing duplicate transmission of said message frames from said one message frame input, a second converting means having a pair of message frame inputs and a single message frame output, a message frame transmitting means connected to said single message frame output, a selector means connected to said pair of message frame inputs and directly transmitting each bit of the message frame from one of said inputs, means for connecting the first trunk line to one of said pair of message frame inputs and to said single message frame output and connecting the second trunk line to the second of said message frame inputs, and one of said stations including means for connecting the first trunk line to a first of said pair of outputs of said first converting means to a first of said pair of inputs of said second converting means and connecting the second of said pair of outputs of said first converting means to the second of said pair of inputs of said second converting means and thereby provide a simultaneous flow of said message frame in the same direction relative to said controller means and said remote stations, and wherein said signal logic means of said first converting section includes a receiver connected to said inputs, a pair of transmitters connected to said outputs, said transmitters having signal input means for receiving the bit signals and a strobe means for activating the transmitters, a bit transmitting means connected between said receivers and both of said transmitters, a disable timing means connected to said receiver and operable to disable and receiver, and a delay timing means connected to said receiver and activated thereby, and establishing an output after a predetermined period, said delay timing means being connected to said strobe means and to said disable timing means for simultaneous operation thereof.

2. In the loop communication system of claim 1 wherein an isolating transformer is connected between said receiver and said input means, said bit transmitting means including a logic level sensor and transmitting setting circuit connected between said receiver and both of said transmitters, said transmitters having interconnected strobe means for simultaneous actuation of said transmitters, a receiver disable timing means connected to said receiver and operable to disable said receiver, and a delay timing means connected to said receiver and activated thereby, said delay timing means being connected to strobe means and to disable timing means for simultaneous operation thereof.

3. In a loop communication system having a controller station having a controller output means adapted to generate time spaced multiple bit message frames and having a controller input means adapted to receive said message frames, a plurality of remote stations, a first transmission trunk line for connecting said controller means and said remote stations in a series conducting loop including a first remote station and a second remote station, a second transmission trunk line for producing a parallel conducting branch in said loop, a message converting adaptor apparatus for connecting the first and second transmission trunk lines in said loop comprising a first converting means having a single message frame input and a pair of signal transmitting means each one connected to one of a pair of message frame outputs, a signal logic means connected to said input and said outputs and transmitting said message frame from said frame input to both of said transmitting means and thereby producing the same message frame on said outputs as the message frame received at said frame input, means for connecting of the first trunk line to said frame message inputs and to one of said pair of message frame outputs, means for connecting of the second trunk line to the second of said pair of message frame outputs and thereby providing duplicate transmission of said message frames from said one message frame input, a second converting means having a pair of message frame inputs and a single message frame output, a message frame transmitting means connected to said single message frame output, a selector means connected to said pair of message frame inputs and directly transmitting each bit of the message frame from one of said inputs, means for connecting the first trunk line to one of said pair of message frame inputs and to said single message frame output and connecting the second trunk line to the second of said message frame inputs, and one of said stations including means for connecting the first trunk line to a first of said pair of outputs of said first converting means to a first of said pair of inputs of said second converting means and connecting the second of said pair of outputs of said first converting means to the second of said pair of inputs of said second converting means and thereby provide a simultaneous flow of said message frame in the same direction relative to said controller means and said remote stations, and wherein said signal selector means of said second converting section includes a first throughput switch means connected to the first input means and the output means and a second throughput switch means connected between the second input means and the output means, a comparator means connected to said input means and establishing a pair of logic outputs providing a coded signal related to the receipt of signals at said input means, said comparator network being connected to selectively actuate the throughput switches to selectively activate a single throughput switch for direct transmission of said message frames.

4. In the loop communication system of claim 3 wherein said comparator means is constructed to activate the first throughput switch means in response to a message bit at the first input means and in response to the absence of the message bit at the first and second input means, and activating the second throughput switch means in response to a message bit at the second input means and the absence of a message bit at the first input means.

5. In the loop communication system of claim 3 wherein said comparator means includes individual sensor means connected to said input means and establishing a pair of opposite level logic signals, said first throughput switch means including a first logic gate means having inputs connected to said first input means and to the sensor means to activate the first throughput switch means in response to a message bit at the first input means and in response to the absence of the message bit at the first and second input means, said second throughput switch means including logic gate means having inputs connected to said second input means and to said sensor means to activate the second throughput switch means in response to a message bit at the second input means and the absence of a message bit at the first input means.

6. In the loop communication system of claim 5 including a pair of logic gate means defining a pair of enabling output means connected one each to said throughput switch means, said gate means having a first input means connected to the one output of the first sensor means and having second input means connected to the opposite outputs of the second sensor means.

7. In a loop communication system having a controller station having a controller output means adapted to generate time spaced multiple bit message frames and having a controller input means adapted to receive said message frames, a plurality of remote stations, a first transmission trunk line for connecting said controller means and said remote stations in a series conducting loop including a first remote station and a second remote station, a second transmission trunk line for producing a parallel conducting branch in said loop, a message converting adaptor apparatus for connecting the first and second transmission trunk lines in said loop comprising a first converting means having a single message frame input and a pair of signal transmitting means each one connected to one of a pair of message frame outputs, a signal logic means connected to said input and said outputs and transmitting said message frame from said frame input to both of said transmitting means and thereby producing the same message frame on said outputs as the message frame received at said frame input, means for connecting of the first trunk line to said message inputs and to one of said pair of message frame outputs, means for connecting of the second trunk line to the second of said pair of message frame outputs and thereby providing duplicate transmission of said message frames from said one message frame input, a second converting means having a pair of message frame inputs and a single message frame output, a message frame transmitting means connected to said single message frame output, a selector means connected to said pair of message frame inputs and directly transmitting each bit of the message frame from one of said inputs, means for connecting the first trunk line to one of said pair of message frame inputs and to said single message frame output and connecting the second trunk line to the second of said message frame inputs, and one of said stations including means for connecting the first trunk line to a first of said pair of outputs of said first converting means to a first of said pair of inputs of said second converting means and connecting the second of said pair of outputs of said first converting means to the second of said pair of inputs of said second converting means and thereby provide a simultaneous flow of said message frame in the same direction relative to said controller means and said remote stations, and wherein said signal logic means of the first converting means includes a logic level sensing means connected to said single input means and a timing means connected to said single input means, and a pair of identical transmitting means for transmitting of bit signals and each having a pair of inputs a first of which is connected to the sensing means and a second of which is connected to the timing means, and timing means being activated by each message bit and generating a signal a predetermined period thereafter to delay activation of the transmitting means, said transmitting means being connected to the output means of said first converting section.

8. In the loop communication system of claim 7 wherein said signal logic means of the second converting means includes a selector unit having a pair of inputs connected to the input means and a pair of monitor means connected to the input means, and said monitor means responding to the signals at the input means to generate a binary code to the selector unit to transmit the message frame from only one of the input means.

9. In the loop communication system of claim 8 including a logic level sensing means connected to the output of the selector unit and a timing means connected to the output of the selector unit, said timing means establishing a time delay, and a single transmitting means having a pair of inputs a first of which is connected to said sensing means and a second of which is connected to said timing means to transmit a message bit after the predetermined time established by said timing means.

10. In the loop communication system of claim 7 wherein said signal logic means includes only circuit elements wholly powered by the signal bits of the incoming message frame and said converting sections having an operating period significantly less than the total period of each message bit to establish a corresponding time delay and an essentially transparent signal coupling to the loop controller means.

11. In the loop communication system of claim 7 wherein said signal logic means of said second converting section includes a selector unit having a comparator means responsive to receipt of the message frames at the input means to establish a selection code, said selector unit having throughput logic switch means connected to and actuated by said comparator means, logic means to transmit the message from either of said throughput logic switch means, a transmitting means, a logic level sensor connected between the last named logic means and the transmitting means to set the transmitting means, and a timing means connected between the last named logic means and the transmitting means and establishing a timed delay activation of the transmitting means to remove transient-type signals.

12. In the loop communication system of claim 11 wherein said input means includes receiver amplifiers, said timing means including a disable timer means connected to said receiver amplifier and operable to disable said receiver amplifiers.

13. In the loop communication system of claim 12 wherein said timing means includes a delay timer means connected between said selector unit and said disable timer and said transmitting means to momentarily delay operation of said disable timer and said transmitting means.

14. In the loop communication system of claim 7 wherein a pair of output lines connected to said transmitting means, a by-pass switch connected between said input to the receiver and one of said pair of output lines and operable to directly connect the input to said output line, said signal processing and logic means of the second converting section having first and second receivers connected to the pair of input means to receive and transmit the message bit signals, a selector unit connected to said receivers to receive both message bit signals and having a single selected output, first and second monitors connected to the first and second receivers and establishing related opposite binary logic signals in accordance with the presence and absence of message bit signals, said selector unit having a decoding means connected to said monitors and operable to select one of said receivers for transmission of the message bit signal, a logic level sensor connected to said selector unit and establishing an output in response to a message bit signal from said selector unit, a delay timing means connected to said selector unit and establishing an output a predetermined time after receipt of a message bit signal, a single transmitter having a signal input connected to said selector unit and a control input connected to said timing means, a single output line connected to said transmitter, a by-pass switch connected between said output to the single transmitter and one of said pair of input lines to the pair of receivers and operable to directly connect one of the inputs to said single output line, and operating means to actuate said switch means, said operating means includes a power sensing means connected to monitor the power supply to the adaptor and responsive to a power failure to actuate said first and second by-pass switches, and each of said timing means includes a disable timing device operated by said output of the timing means and connected to disable said receivers and a strobing timing means operated by said output of the timing means and connected to activate the transmitters.

15. In the loop communication system of claim 14 wherein each message bit has a corresponding time period and each of said converting sections transmitting the message bit with a total delay of less than essentially one-quarter of said time period.

16. In the loop communication system of claim 15 wherein said time period is of the order of two microseconds, said delay timing means has a period of the order of 100 nanoseconds, said strobe timing means has a period of the order of 500 nanoseconds and said disable timing means has a period of the order of one microsecond.

17. In the loop communication system of claim 14 wherein said selector unit includes a first throughput switch means connected between the first input and the output and a second throughput switch means connected between the second input and the output, said throughput switches including logic gate means having inputs connected to the corresponding receiver and having logic control inputs, said monitors being connected to each of said control inputs, each signal monitor including a sensor establishing a pair of opposite level logic signals corresponding to the receipt of a message signal, and a decoding network connected to said sensors and establishing a pair of logic outputs connected to said logic gate means and providing encoded signals related to the receipt of message bit signals to activate one of the logic gate means conjointly with the message bit signal.

18. Adaptor apparatus for connection to a single input-output ported loop apparatus employing a digital message frame comprising a first converting section having a single message frame input connected to a pair of dual message frame outputs, said first converting section including a signal processing and logic means connected to said frame input for directly converting a single incoming message frame into a pair of identical message frames, and a second converting section having a pair of message frame inputs for simultaneously receiving identical message frames and connected by a pair of first and second circuits to a single message frame output, said second converting section having a signal processing and logic means to selectively transmit simultaneously received individual message frames at said pair of inputs as an identical single message frame at said output, and wherein said first converting section includes a receiver connected to said input, a pair of transmitters connected to said outputs, a logic level sensor and setting circuit connected between said receiver and both said transmitters, and transmitters having interconnected strobe means for simultaneous actuation of said transmitters, a receiver disable timing means connected to said receiver and operable to disable said receiver, and a delay timing means connected to said receiver and activated thereby, said delay timing means being connected to strobe means and to disable timing means for simultaneous operation thereof.

19. In a loop communication system having a single controller having a controller output means adapted to generate time spaced multiple bit message frames and having a controller input means adapted to receive said message frames, a plurality of remote stations, a first transmission trunk line for connecting said controller means and said remote stations and establishing transmission of each message frame in a series conducting loop including at least a first remote station and a last remote station, a second transmission trunk line for producing a parallel conducting branch in said loop, a message converting adaptor apparatus for connecting the first and second transmission line in said loop, comprising a first converting means having a single message frame input connection to said controller output means and a pair of signal transmitting means each one connected to one of a pair of message frame outputs, a signal logic means connected to said input and said outputs and transmitting said message frame from said frame input to both of said transmitting means and thereby producing the same message frame on said outputs as the message frame received at said frame input, means for connecting of the first trunk line to one of said pair of message frame outputs, means for connecting of the second trunk line to the second of said pair of message frame outputs and thereby providing duplicate transmission of said message frames from said one message frame input to said first remote stations, a second converting means having a pair of message frame inputs and a single message frame output, a message frame transmitting means connected to said single message frame output, a selector means connected to said pair of message frame inputs and directly transmitting each bit of the message frame from one of said inputs, and said last remote station including means for connecting the first trunk line to one of said pair of message frame inputs and connecting the second trunk line to the second of said message frame inputs and connecting said first trunk line from said single message frame output means to said controller input means.

20. The loop communication system of claim 19 wherein said dual message frame outputs and said dual message frame inputs each includes a primary output and a primary input connected to said first transmission trunk line to transmit and to receive message frames from at least one of said remote stations and establishing normal message transmission and each includes a secondary output and a secondary input connected to each other by said second transmission trunk line and establishing backup message transmission through said at least one of said remote stations in response to failure of said normal message transmission.

21. The loop communication system of claim 19 wherein said adaptor apparatus includes individual adaptor units between each remote station and said trunk lines and each of said adaptor units having said single message input and said single message frame output connected to said first transmission trunk lines, said adaptor units include selector means whereby said dual message frame outputs and said dual message frame inputs each includes a primary output and a primary input connected to the first transmission trunk line to transmit and to receive message frames from the connected remote station and establishing normal message transmission through the remote station and a secondary output and a secondary input connected to the second transmission trunk lines and thereby each other and establishing backup message transmission through the connected remote station in response to failure of said message transmission on said first transmission trunk line.

22. The loop communication system of claim 19 wherein said adaptor apparatus has said single message frame input and said single message frame output connected to said transmission lines, said adaptor apparatus includes selector means whereby said dual message frame outputs and said dual message frame inputs each include a primary output and a primary input connected to transmit and to receive message frames from at least one of said remote stations and establishing normal message transmission and a secondary output and a secondary input connected to each other and establishing backup message transmission through said at least one of said remote stations in response to failure of said normal message transmission, and a by-pass means connected to connect said single message frame input and said single message frame output to said primary output and to said primary input to directly transmit said message frames.

23. The loop communication system of claim 22 wherein said by-pass means responds to a failure within the adaptor apparatus.

24. The loop communication system of claim 22 including a first loop segment and a second loop segment to be series connected with each other in the trunk lines, said adaptor apparatus has said single message frame input and said single message frame output connected to said transmission trunk lines, said adaptor apparatus includes selector means whereby said dual message frame outputs and said dual message frame inputs each include a primary output and a primary input connected to said first loop segment and operable to transmit and to receive message frames from said first loop segments and establishing normal message transmission and a secondary output and a secondary input connected to each other and establishing backup message transmission through the second loop segment about said first loop segment in response to failure of said normal message transmission.

25. The loop communication system of claim 24 wherein a second adaptor apparatus has said single message frame input and said single message frame output connected to said transmission trunk lines, said second adaptor apparatus includes selector means whereby said dual message frame outputs and said dual message frame inputs each include a primary output and a primary input connected to said second loop segment and operable to transmit and receive message frames from said second loop segment and establishing normal message transmission and a secondary output and a secondary input connected to each other and establishing backup message transmission about said second loop segment in response to failure of said normal message transmission.

26. The loop communication system of claim 19 including a separate one of said adaptor apparatus for each remote station, each adaptor apparatus having said single message frame input and said single message frame output connected to said transmission trunk lines, each adaptor apparatus includes selector means whereby said dual message frame outputs and said dual message frame inputs each include a primary output and a primary input connected to transmit and to receive message frames from the corresponding connected remote station and establishing normal message transmission to and from the remote station and a secondary output and a secondary input connected to each other and establishing backup message transmission about the corresponding remote station in response to failure of said normal message transmission.

27. The loop communication system of claim 19 wherein a separate adaptor at said first remote stations include means connecting the second trunk line from said first converting means directly to second trunk line of said second converting means at the same remote station for passing of said message frame from either of said trunk lines through said first remote station.

28. In a loop system having a first controller and a second controller each having a controller output means adapted to generate time spaced multiple bit message frames and having a controller input means adapted to receive said message frames, a plurality of remote stations, a first transmission trunk link adapted to connect said controllers to said remote stations in a series conducting loop, a second transmission trunk line for producing a parallel conducting path in said loop, a message converting adaptor apparatus for connecting the first and second transmission line from said first and second controllers to said remote stations comprising a first converting means having a single message frame input and a pair of signal transmitting means each one connected to one of a pair of message frame outputs, a signal logic means connected to said input and said outputs and transmitting said message frame from the frame input to both of said transmitting means and thereby producing the same message frame on said outputs as the message frame received at said frame input, means for connecting of the first trunk line to one of said pair of message frame outputs and to the input means of said first controller, means for connecting of the second trunk line to the second of said pair of message frame outputs and to the input means of said second controller and thereby providing duplicate transmission of said message frames to said controllers, a second converting means having a pair of message frame inputs and a single message frame output, means connecting the first trunk line from the output means of the first controller to one of said message frame inputs and the second trunk line from the second controller to the other of said message frame inputs, said second converting means including a message frame transmitting means connected to said single message frame output, a selector means connected to said pair of message frame inputs and directly transmitting each bit of the message frame from one of said inputs, means for connecting the input of the first converting means to the message frame output of the second converting means.

29. The loop communication system of claim 28 wherein said plurality of remote stations are connected in series in said first and second lines, said second converting means has its outputs connected to a remote station and its inputs connected to the outputs of the controllers, said single input and single output being interconnected, said first and second lines to the first remote station being connected to said pair of dual message frame outputs, a second adaptor apparatus corresponding in construction to said first named adaptor apparatus, said second adaptor having its single input of its first converting means connected to the single output of its second converting means, said second adaptor having a pair of dual message frame inputs connected to first and second lines from the last remote station and a pair of dual message frame outputs connected to the input means of said first and second controllers.

30. The loop communication system of claim 28 wherein said trunk lines including a single transmission trunk connected to said single input and said single output, said first and second controllers each having an output connected to said pair of dual message frame inputs and having an input connected one each to said pair of dual message frame outputs.

* * * * *

UNITED STATES PATENT AND TRADEMARK OFFICE
CERTIFICATE OF CORRECTION

PATENT NO. : 4,042,780
DATED : August 16, 1977
INVENTOR(S) : FREDERICK J. WOLTERS It is certified that error appears in the above-identified patent and that said Letters Patent are hereby corrected as shown below:

| | | | |
|---|---|---|---|
| Column 8, | Line 6, | | cancel entire line "system over the primary trunk line 1 or for connection"; |
| | Line 7, | | cancel "in a single loop"; |
| Column 11, | Line 59, | | cancel "trucks" and insert --- trunks ---; |
| Column 12, | Line 33, | | cancel "conncected" and insert --- connected ---; |
| Column 14, | Line 30, | | cancel "ciculated" and insert --- circulated ---; |
| Column 17, CLAIM 1 | Line 42, | | after "disable" cancel "and" and insert --- said ---; |
| Column 22, CLAIM 18 | Line 9, | | after "transmitters," cancel "and" and insert --- said ---. |

Signed and Sealed this

Seventh Day of February 1978

[SEAL]

Attest:

RUTH C. MASON
*Attesting Officer*

LUTRELLE F. PARKER
*Acting Commissioner of Patents and Trademarks*